United States Patent [19]

Skovhoj

[11] Patent Number: 4,689,940
[45] Date of Patent: Sep. 1, 1987

[54] LAWN AND GARDEN MAINTENANCE APPARATUS

[76] Inventor: Jens B. Skovhoj, 128 Brahms Avenue, Willowdale, Ontario, Canada, M2H 1H8

[21] Appl. No.: 743,627

[22] Filed: Jun. 11, 1985

Related U.S. Application Data

[62] Division of Ser. No. 465,779, Feb. 11, 1983, Pat. No. 4,546,601.

[51] Int. Cl.$^4$ .................... A01D 35/24; A01B 73/00
[52] U.S. Cl. ............................. 56/228; 56/15.9; 172/24; 172/656
[58] Field of Search .............. 56/6, 7, 15.2, 15.9, 56/249, 228; 172/24, 311, 98, 476, 446, 645, 649, 656

[56] References Cited

U.S. PATENT DOCUMENTS

| 720,113 | 2/1903 | Collins | 172/24 |
| 2,255,253 | 9/1941 | Harris | 172/656 |
| 4,429,515 | 2/1984 | Davis et al. | 56/6 |

FOREIGN PATENT DOCUMENTS

| 98773 | 4/1940 | Sweden | 172/24 |
| 122962 | 7/1958 | U.S.S.R. | 172/24 |

Primary Examiner—Gene Mancene
Assistant Examiner—John G. Weiss

[57] ABSTRACT

An apparatus for use in lawn and garden maintenance, in which a chassis having a pair of axially aligned and independently operable drive wheels carries a cultivator comprising a frame mounted on the chassis and movable pivotably in the vertical plane of the axis of the drive wheels, a plurality of hoes adjustably mounted on the frame, and means mounted on the chassis to raise and lower the frame pivotably into an inoperative and an operative position respectively.

5 Claims, 10 Drawing Figures

FIG. 10 a lawn and garden maintenance apparatus

LAWN AND GARDEN MAINTENANCE APPARATUS

This application is a division of U.S. patent application Ser. No. 465,779, now U.S. Pat. No. 4,546,601, filed Feb. 11, 1983, in the name of Jens Bay Skovhoj.

FIELD OF THE INVENTION

This invention relates to lawn and garden maintenance apparatus and more particularly to a vehicle for mowing and trimming grass, for cultivating the soil in flower beds and around trees and bushes, and for blowing and collecting leaves and other light debris.

BACKGROUND OF THE INVENTION

Power operated vehicles are marketed which carry out a variety of landscaping or gardening functions, in particular lawn mowing, grass trimming, lawn edging, soil cultivation and leaf blowing.

Cultivators include vehicles which will circle a tree to break up the soil in a circular bed around the tree. The problem with such vehicles is that uniform movement about the tree is difficult to achieve. It is an object of the present invention to provide a cultivator which will guide the vehicle in a uniformly circular movement about a tree.

It is a further object of the invention to provide a lawn and garden maintenance vehicle operable by a single person to cultivate soil.

SUMMARY OF THE INVENTION

Essentially the invention consists of an apparatus for use in lawn and garden maintenance comprising: a chassis having a pair of axially aligned and independently operable drive wheels journally mounted thereon and having at least one idler wheel swivelly mounted thereon offset from the axis of the drive wheels; and a cultivator having a frame mounted on the chassis and movable pivotably in the vertical plane of the axis of the drive wheels, a plurality of hoes adjustably mounted on the frame; and means mounted on the chassis to operate the drive wheels and to pivot the tiller upwardly into an inoperative position and downwardly into an operative position.

BRIEF DESCRIPTION OF THE DRAWINGS

An example embodiment of the invention is shown in the accompanying drawings in which.

DETAILED DESCRIPTION OF PREFERRED EMBODIMENT

The example embodiment shown in the drawings consists of a vehicle 10 having a main chassis or frame 12 on which is mounted an internal combustion motor 14 connected through a drive shaft 16 and a gear box 17 (see FIG. 2) with a pair of hydraulic transmissions 18 having a cooling fan 19. A pair of carriage wheels 20 are journally mounted on frame 12, each wheel being driven independently from one of transmissions 18 through a sprocket and gear train 22 which engages axle 23 of the driven wheel. An idler wheel 24 is mounted at the rear of frame 12 for free pivotal movement about a vertical axis.

Figures 7, 8:
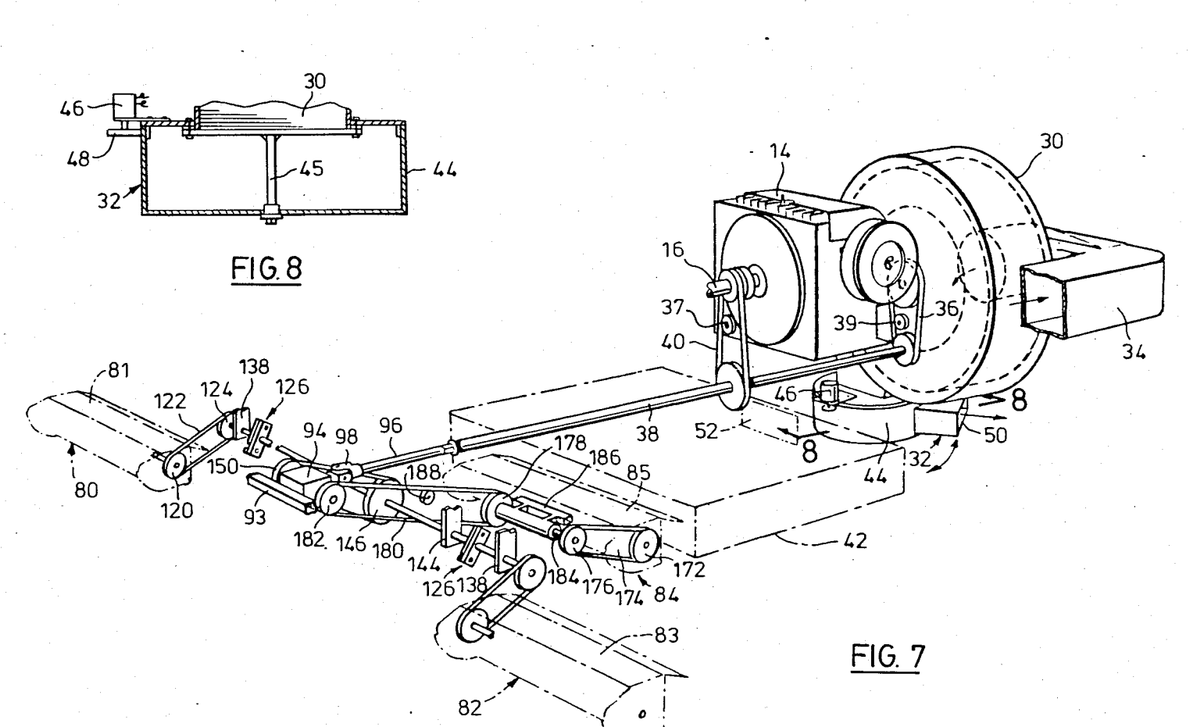
FIG. 7 is a perspective view of the drive train for the mowers and the blower.
FIG. 8 is a cross-sectional view taken along line 8—8 of FIG. 7.

A housing 26 covers transmissions 18 and a seat 28 rests on the housing. Behind motor 14 a blower 30 is mounted on frame 12, as seen more particularly in FIG. 7, with a rotatable air outlet nozzle 32 positioned beneath the blower. An air intake duct 34 mounted on frame 12 leads into blower 30 and the blower is driven from motor 14 through a belt 36 from an ancillary drive shaft 38 which is driven off the motor by another belt 40. Belts 36 and 40 are tensioned by spring biased pulleys 37 and 39 respectively which, are pivotally mounted on frame 12 and which, when not bearing against the belts, cause the belts to be disengaged from drive shaft 38. A collection container 42 is fixed beneath frame 12 as indicated in chain dotted lines in FIG. 7. Outlet nozzle 32 of blower 30 opens from a cylindrical plenum chamber housing 44 which is rotatable in a vertical shaft 45 by means of an electric motor 46 and a contact friction wheel 48 as seen in FIG. 8 whereby the outlet opening 50 of the nozzle may be moved in any direction in a horizontal plane. Blower 30 may be used as collector of leaves or other light debris by attaching a flexible hose and suction nozzle (not shown) to duct 34 and registering opening 50 of nozzle 32 with an inlet 52 of container 42.

Figure 2:
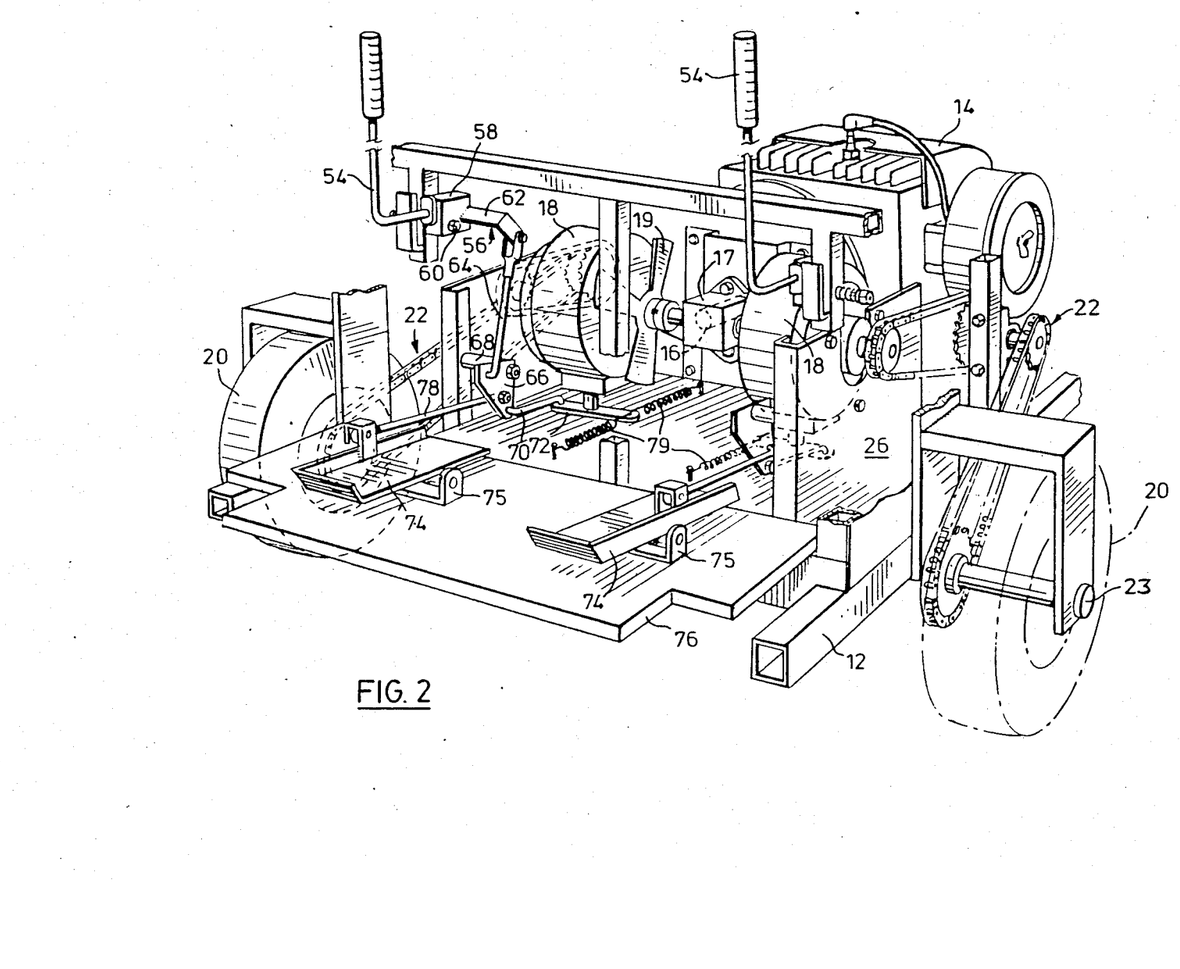
FIG. 2 is a perspective view of the main body portion of the apparatus of FIG. 1 showing the wheel drive and steering mechanisms.

As seen in FIG. 2 of the drawings, the steering mechanism of vehicle 10 consists of a pair of hand control levers 54 pivotally mounted on frame 12 one on each side of seat 28. Each lever 54 is interconnected with one of hydraulic transmissions 18 by a linkage 56 which consists of a block 58 pivotable in a vertical plane about a pin 60 and having a lateral arm 62 pivotally connected to a rod 64 which in turn is pivotably connected to a plate 66 pivotable in a vertical plane about a pin 68. A further rod 70 is pivotally connected at one end to plate 66 and at the other end to a toggle 72 which controls the hydraulic feed valve for transmission 18. A pair of foot control treadles 74, each mounted on a pivot 75 fixed on a footboard 76 on frame 12, are also interconnected with transmission 18, each by means of a rod 78 which is pivotally connected at one end to lever 74 and at the other end to plate 66. Toggle 72 is biased into a neutral (closed) position by a pair of tension springs 79 pinned to frame 12.

Figures 3, 4:
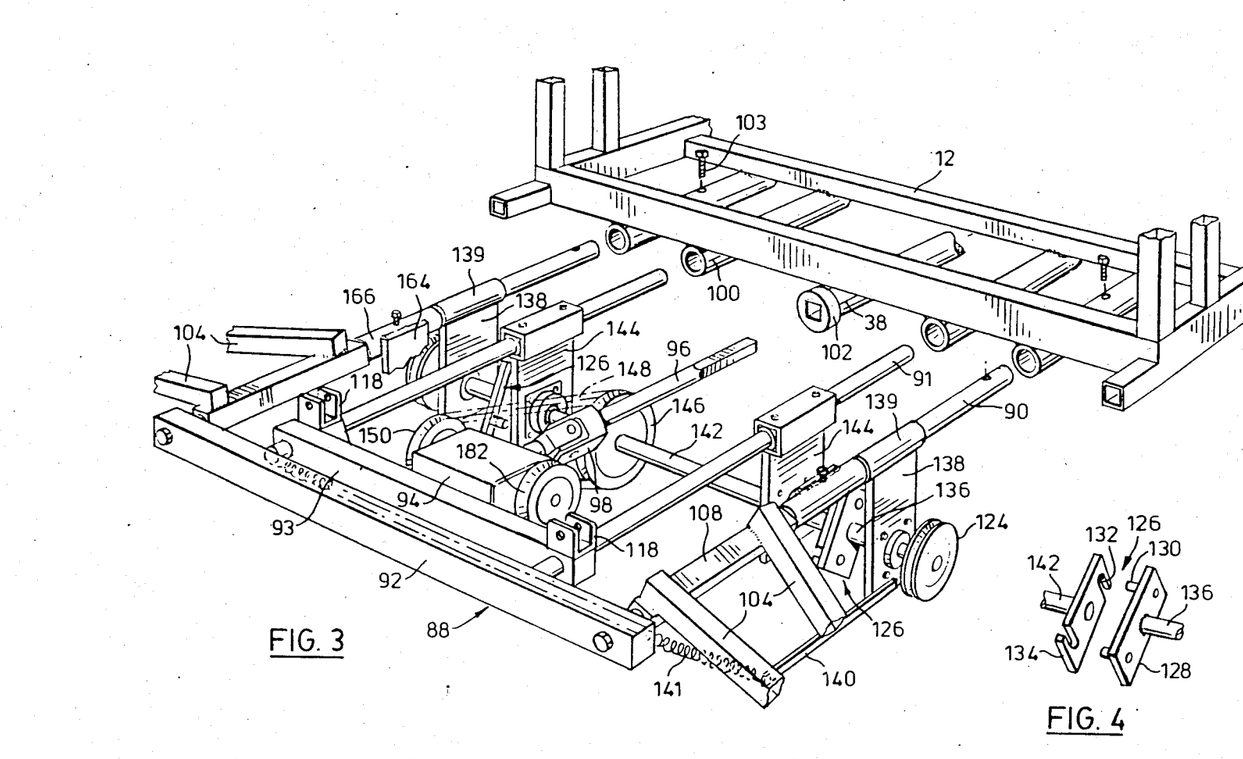
FIG. 3 is a perspective view of the support frame for the outer reel mowers.
FIG. 4 is a perspective view of the clutch for the outer reel mowers.
Figure 5:
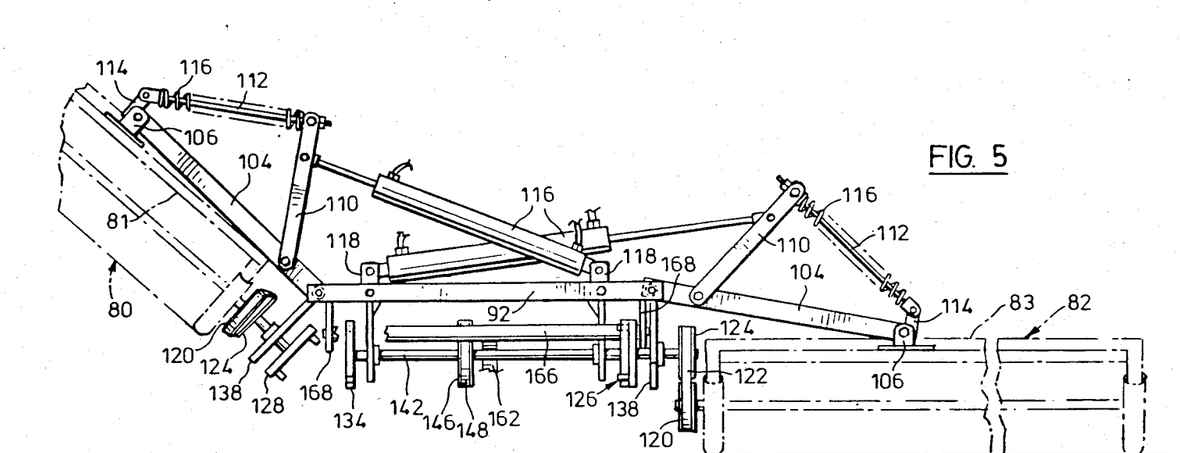
FIG. 5 is a front view, in elevation, of the mounting assembly for the outer reel mowers.
Figure 6:
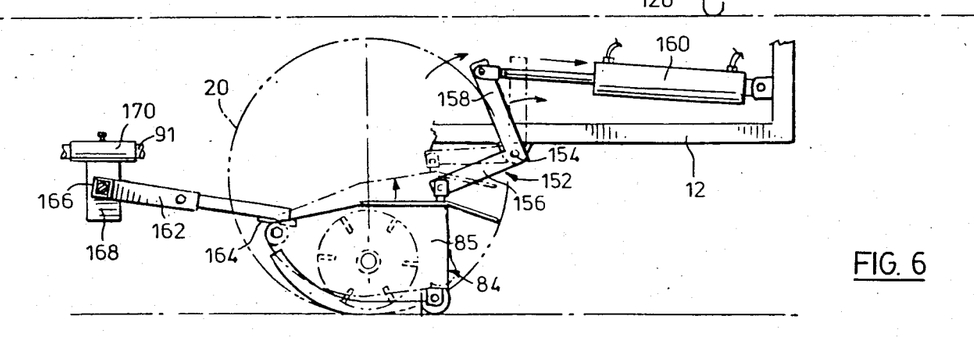
FIG. 6 is a side view, in elevation, of the mounting assembly for the central mower.

Three reel mowers 80, 82 and 84 have frames 81, 83 and 85 carried by frame 12 as shown in FIGS. 1 and 3 to 7 of the drawings. As seen more particularly in FIGS. 1 and 7, outside mowers 80 and 82 are located in front of drive wheels 20 on each side of the fore and aft centre line 86 of the machine while central mower 84 is located directly between drive wheels 20 in the transverse vertical plane 86 of the axles of the drive wheels as seen in FIG. 6. As shown in FIGS. 3 and 5, the mounting for outside mowers 82 and 84 consists of an auxiliary frame 88 which comprises spaced pairs of parallel outer rods 90 and inner rods 91 extending rearwardly from a crossbrace 92. Inner rods 91 carry an auxiliary crossbrace 93 on which a gear box 94 is mounted. A drive shaft plug 96, parallel to rods 90, is connected to gear box 94 by a universal joint 98. The free ends of rods 90 and 91 are insertable into tubes 100 fixed to the bottom portion of frame 12, drive shaft plug 96 being insertable into a socket 102 at the end of ancillary drive shaft 38 (see FIG. 7). Rods 90 and 91 are releasably secured in tubes 100 by bolts 103.

The frame 81, 83 of each outside mower 80, 82 is mounted on a yoke brace 104 (see FIGS. 1, 3 and 5), a bracket 106 on each outside mower being pivotally attached to the end of the stem of the brace. The ends of the arms of brace 104 are fixed to a tube 108 which is freely mounted axially on outer rod 90. A bar 110 is pivotally attached at one end to brace 104 adjacent tube 108 and carries at its other end a longitudinally slidable transverse rod 112 which is also attached to bracket 106 by a link 114. Rod 112 carries a compression spring 116 which bears at one end against bar 110 and at the other end against link 114 and acts as a shock absorber. An hydraulic jack 116 is pivotally attached at one end to bar 110 and at the other end to a bracket 108 fixed on auxiliary crossbar 93.

The drive train for each mower 80, 82 consists of an axially mounted pulley 120 connecting the reel of the mower by a belt 122 to a further pulley 124 which is driven by a clutch 126. As seen in FIGS. 3 and 4, clutch 126 comprises a pair of plates, one plate 128 carrying a pair of pins 130 which engage a pair of slots 132 in the other plate 134 of the clutch. Pulley 124 and clutch plate 128 are fixed on the ends of a shaft 136 journally mounted on a hanger 138 which has a tubular hub 139 freely rotatable axially on rod 90. A bar 140 extends transversely from hanger 138 and a tension coil spring 141 is connected between the bar and inner rod 91 of auxiliary frame 88 remote from the hanger. Clutch plate 134 is fixed on the end of a shaft 142 journally mounted on a pair of hangers 144 which are fixed on inner rods 91. A pulley 146 keyed on shaft 142 is connected by a belt 148 to a pulley 150 driven off gear box 94.

Centre mower 84 is suspended between drive wheels 20 by a pair of bellcranks 152 which are each pivotally mounted on frame 12 by a pin 154, one arm 156 of the bellcrank being pivotally connected to an hydraulic jack 160 which is in turn pivotally connected to frame 12. Also a centrally located tie bar 162 is connected between centre mower 84 and outer rods 90 of auxiliary frame 88, one end of the tie bar being fixed by a pivotal bracket 164 to the centre mower and the other end being pivotally attached to a crossbar 166 which is journally mounted on a pair of hangers 168 each having a tubular hub 170 fixed to one of rods 91. The drive for centre mower 84 is shown in FIG. 7 of the drawings and consists of a first sprocket 172, mounted axially on the reel of the mower, which is connected by a first chain 174 to a second sprocket 176 and thence through a third pulley 178 and a belt 180 to a fourth pulley 182 driven off gear box 94. Pulleys 176 and 178 are each keyed on a shaft 184 axially rotatable in a journal bracket 186 fixed on centre mower 84. Belt 180 is tensioned by a spring biased pulley 188 which is mounted on hangers 168 and which, when not bearing against the belt, causes the belt to be disengaged from pulley 82 when central reel mower 84 is raised.

Figure 1:
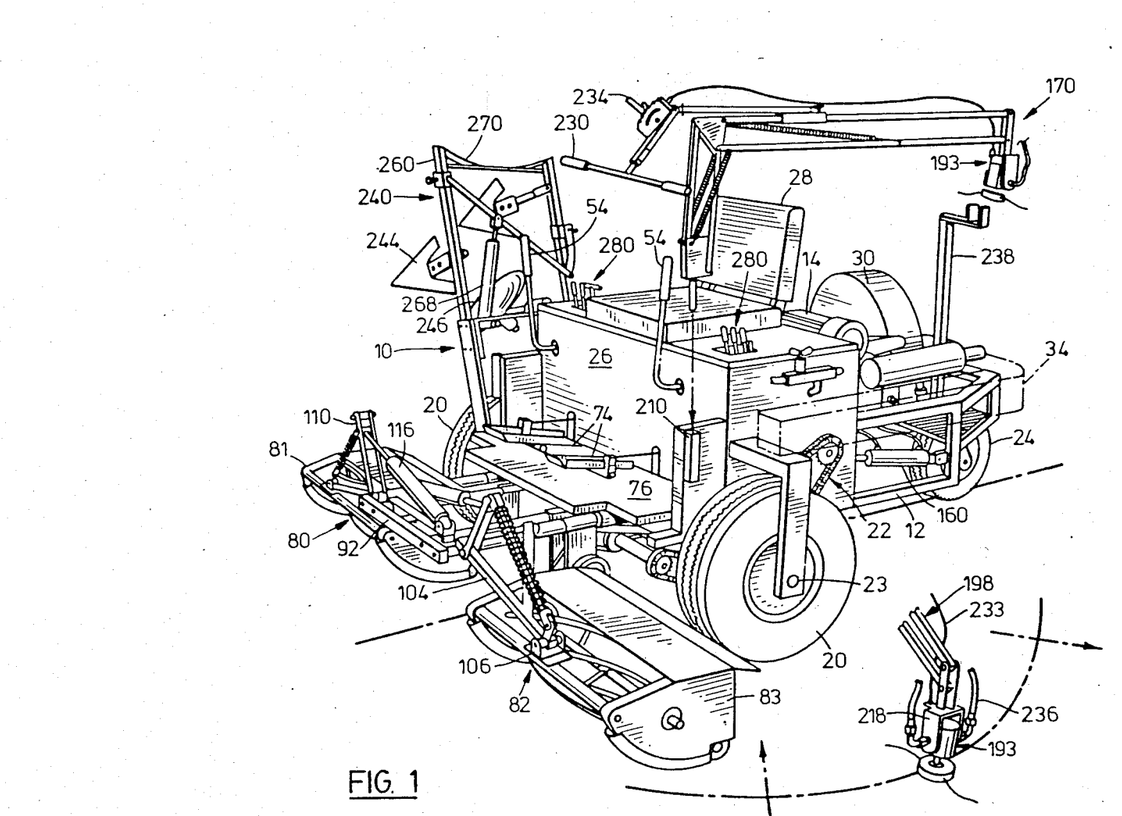
FIG. 1 is a perspective view, in elevation, of a lawn and garden maintenance apparatus.
Figure 9:
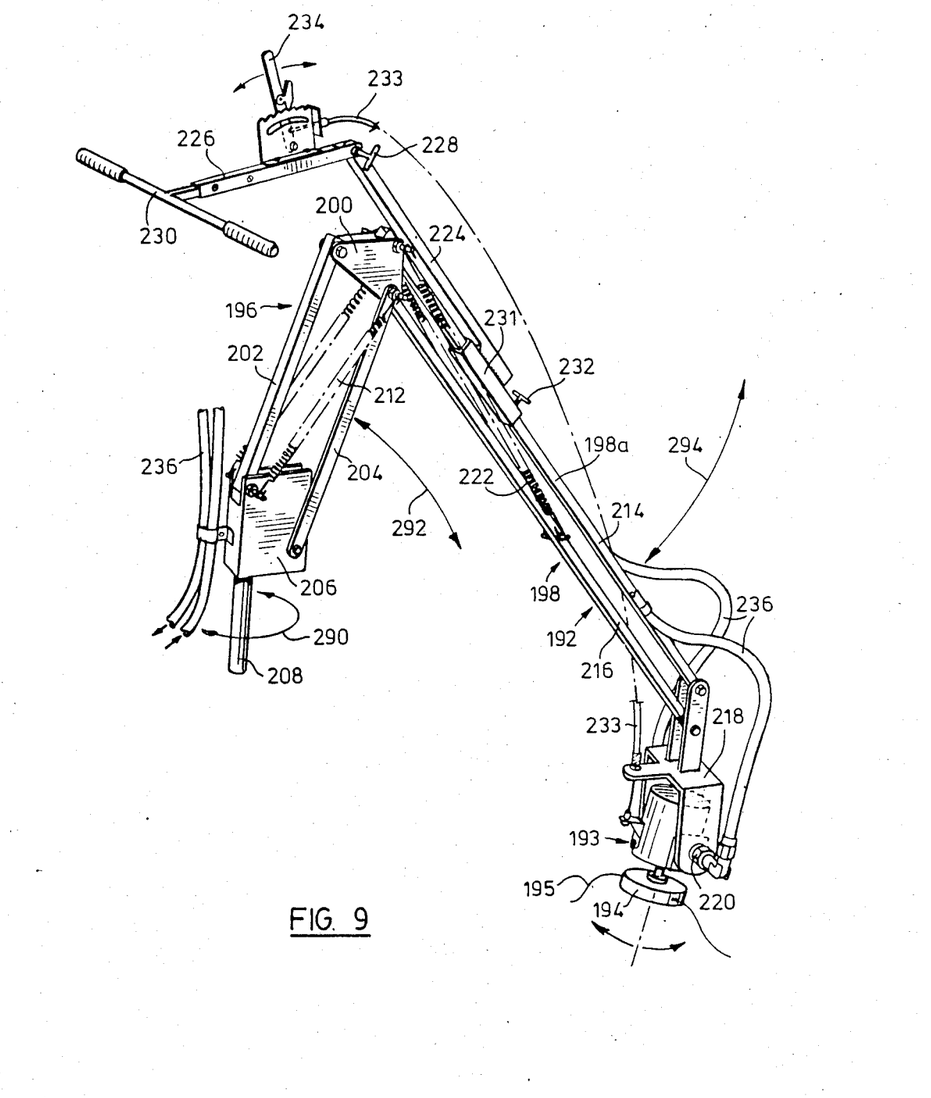
FIG. 9 is a perspective view of the grass trimmer.

A grass trimming device 190 is shown in FIG. 1 and 9 of the drawings and consists of a manually controlled articulated arm 192 carrying a trimmer 193 of known construction consisting of a rotatable spinner 194 having one or more radiating nylon threads 195. Arm 192 comprises a parallelogram unit 196 and a parallelogram unit 198 joined by a triangular elbow bracket 200 and lying in a vertical plane. Parallelogram unit 196 has an upper bar 202 and a parallel lower bar 204 each pivotally attached at one end to elbow bracket 200 and at the other end to a bracket 206 which is fixed on a vertical post 208 freely inserted in a socket 210 fixed on the side of frame 12. A pair of diagonal tension springs 212 interconnect that end of upper bar 202 joined to bracket 206 with that end of lower bar 204 joined to elbow bracket 200. Parallelogram unit 198 has an upper bar 214 and a parallel lower bar 216 each pivotally attached at one end to elbow bracket 200 and at the other end to a bracket 218 which carries trimmer 194 pivotally on a pair of trunnions 220. A pair of diagonal tension springs 222 interconnect that end of upper bar 214 joined to elbow bracket 200 with the midpoint of lower bar 216. An extension bar 224 mounted on upper bar 214 of parallelogram unit 198 projects from the upper end of bar 214 and carries at its free end an extensible arm 226 which is joined to bar 224 by an adjustable locking pin 228. The free end of arm 226 carries a pair of laterally extending handles 230. Bar 224 is fixed on a tube 231 which is releasably clamped on upper bar 214 of parallelogram unit 198 by a locking pin 232. A Bowden wire 233 is connected at one end to trimmer 193 and at the other end to a control lever 234 fixed on arm 226. A pair of lines 236 feed hydraulic fluid through trunnions 220 to trimmer 193 to drive spinner 195. A bracket 238 on frame 12 (FIG. 1) receives device 193 in a position of rest.

Figure 10:
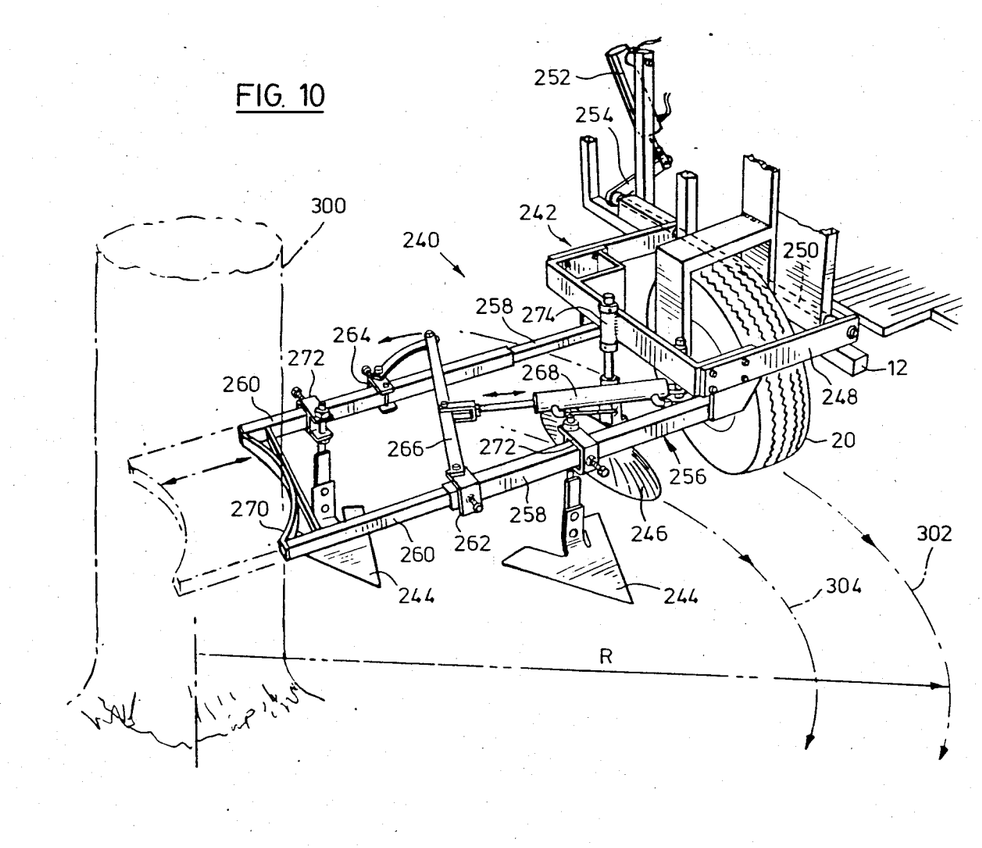
FIG. 10 is a perspective view of the cultivator.

A cultivator 240 is shown in FIG. 10 of the drawings and consists of a frame 242 which is fixed on one side of main frame 12 and carries a plurality of hoes 244 and a disk harrow 246 for edge trimming. Frame 242 comprises a U-shaped bracket 248 having its arms fixed on a pivot shaft 250 journally mounted on main frame 12 and axially rotatable by an hydraulic jack 252 through a crank arm 254. A pair of parallel arms 256 are attached to bracket 248 and extend outwardly from main frame 12. Each arm 256 is telescopic with a fixed section 258 anchored to bracket 248 and a longitudinally slidable section 260. Fixed section 258 of one arm 256 carries an adjustable clamp 262 and slidable section 260 of the other arm 256 carries an adjustable clamp 264. Clamps 262 and 264 are interconnected by an articulated crank 266 pivotally attached to each clamp and movable by an hydraulic jack 268 which is pivotally attached at one end to the crank and at the other end to bracket 248. The free ends of arms 256 are interconnected by a concave bumper 270. Hoes 244 are mounted in a suitable position, and in a suitable number, by adjustable clamps 272. Disk harrow 246 is adjustably mounted in a socket 274 fixed on bracket 248. The central longitudinal axis of frame 242 lies in the vertical plane of the axis of axles 23 of drive wheels 20.

The various hydraulic devices, namely jacks 116, 160, 252 and 268, and trimming device 193, are fed by a compressor (not shown) mounted on main frame 12 and operated by control levers indicated generally by numeral 280 in FIG. 1 of the drawings.

In the operation of the preferred embodiment, vehicle 10 is moved by wheels 20 which are each driven independently from hydraulic transmissions 18 individually controlled by hand levers 54 or foot levers 74. This allows vehicle 10 to be turned about the central vertical axis in transverse vertical plane 86 between wheels 20. By locating central mower 84 in plane 86 the central mower may be operated while vehicle 10 is turning about the central vertical axis in that plane, i.e. while wheels 20 are being rotated in equal and opposite directions, without scuffing the lawn being mowed.

Outer mowers 80 and 82 are raised and lowered, in the manner shown in FIG. 5 of the drawings, individually by hydraulic jacks 116 operated by controls 280. To attain an upper, disengaged position of rest each mower 80, 82 is pulled by the retraction of its associated jack 116 acting on bar 110, which pivots frame 81, 83 about outer rod 90 of auxiliary frame 88. As frame 81, 83 is raised, clutch 126 is disengaged which prevents the reel of the mower from rotating with no load and wearing out the knives on the knife bed. To attain an engaged position of operation each mower 80, 82 is lowered by the extension of its associated jack 116 acting on bar 110. Clutch 126 is engaged by the insertion of pins 130 of clutch plate 128 laterally into slots 132 of clutch plate 134. Clutch 126 is driven off shaft 142, gear box 94 and ancillary drive shaft 38 from motor 14, and the clutch is maintained in engagement by spring 141.

Centre mower 84 is raised and lowered by hydraulic jack 160 which is operated by controls 280, movement into the upper position of rest being indicated by arrows in FIG. 6. As bellcrank 152 raises the rear portion of mower 84, tie bar 162 acts to prevent the forward portion of the mower from dropping to contact the ground. Centre mower 84 is driven off shaft 184, gear box 94 and ancillary drive shaft 38 from motor 14.

Grass trimmer 190, as shown in detail in FIG. 9, is rotatable on a vertical axis on post 208 as indicated by arrow 290, extensible by the movement of parallelogram unit 196 as indicated by arrow 292, and vertically adjustable by the movement of parallelogram unit 198 as indicated by arrow 294. All these movements are performed manually by the manipulation of handles 230. When not in use, trimmer 193 is movable into a position of rest on bracket 238 as seen in FIG. 1. The angle of trimmer 193 is adjustable on trunnions 220 by the manipulation of control lever 234 adjacent handles 230. The length of extension bar 224 of handles 230 is adjustable by releasing locking pin 232 and sliding tube 231 along arm 214 of parallelogram unit 198 while the angle of extensible arm 226 is adjustable by releasing locking pin 228. Actuation of trimmer 193 is controlled by one of control levers 280. Tension springs 212 and 222 act to balance articulated arm 192 in any selected position of parallelogram units 196 and 198.

Cultivator 240 is raised into an inoperative position as shown in FIG. 1, and into an operative position as shown in FIG. 10, by hydraulic jack 252 acting through crank arm 254 on shaft 250 to which frame 242 is fixed. To break the ground around a tree or in a circular flower bed, cultivator 240 is lowered into its operative position and slidable section 260 of frame 242 is extended by hydraulic jack 268 acting on crank 266 to space hoes 244 a suitable distance apart. Where the area around the base of a tree 300 is being cultivated, as indicated in FIG. 10, slidable section 260 may be extended to have bumper 270 bear against the tree whereby frame 242 acts as a radial guide for the circular travel of vehicle 10 around the tree along a path indicated by numeral 302. When disk harrow 246 is used the radial distance R from tree 300 is governed by the perimeter of the cultivated area around the tree along which the harrow travels as indicated by numeral 304. Of course cultivator 240 can be used on noncircular beds.

It will be appreciated that vehicle 10 provides a versatile apparatus for performing a number of different tasks under the guidance of a single operator. In carrying out these tasks the movement of the vehicle may be controlled by hand through levers 54, or it may be controlled by foot through treadles 76 to free the hands of the operator for the manipulation of grass trimmer 190 and control levers 280 which raise and lower mowers 80, 82 and 84 and cultivator 240 and which actuate trimming device 193 and operate blower 30.

I claim:

1. An apparatus for use in lawn and garden maintenance comprising:
   a chassis having a pair of axially aligned and independently operable drive wheels journally mounted thereon and having at least one idler wheel swivelly mounted thereon offset from the axis of the drive wheels; and
   a cultivator comprising a frame mounted on the chassis and movable pivotably in a vertical plane containing the axis of the drive wheels, a plurality of hoes adjustably mounted on the frame, and means mounted on the chassis to raise and lower the frame pivotably into an inoperative and an operative position respectively.

2. An apparatus as claimed in claim 1, including means to extend the frame.

3. An apparatus as claimed in claim 1 in which the means mounted on the chassis to operate the drive wheels includes a pair of pedals each pedal controlling the drive of one of the drive wheels.

4. An apparatus as claimed in claim 1 in which the means mounted on the chassis to operate the drive wheels includes a pair of levers each lever controlling the drive of one of the drive wheels.

5. An apparatus as claimed in claim 1 including a horizontal concave bumper on that end of the frame remote from the chassis.

* * * * *